(12) United States Patent
Hunsinger (10) Patent No.: US 8,544,394 B2
(45) Date of Patent: Oct. 1, 2013

(54) METHOD FOR REDUCING NITROGEN OXIDE ON THE PRIMARY SIDE IN A TWO-STAGE COMBUSTION PROCESS

(75) Inventor: Hans Hunsinger, Weingarten (DE)

(73) Assignee: Forschungszentrum Karlsruhe GmbH, Karlsruhe (DE)

(*) Notice: Subject to any disclaimer, the term of this patent is extended or adjusted under 35 U.S.C. 154(b) by 534 days.

(21) Appl. No.: 12/278,385

(22) PCT Filed: Jan. 18, 2007

(86) PCT No.: PCT/EP2007/000441
§ 371 (c)(1),
(2), (4) Date: Aug. 5, 2008

(87) PCT Pub. No.: WO2007/090510
PCT Pub. Date: Aug. 16, 2007

(65) Prior Publication Data
US 2009/0020048 A1  Jan. 22, 2009

(30) Foreign Application Priority Data

Feb. 7, 2006 (DE) .......................... 10 2006 005 464

(51) Int. Cl.
*F23L 7/00* (2006.01)
*F23G 5/00* (2006.01)

(52) U.S. Cl.
USPC ............ 110/297; 110/248; 110/345; 110/348

(58) Field of Classification Search
USPC ................................. 110/229, 230, 231, 248
See application file for complete search history.

(56) References Cited

U.S. PATENT DOCUMENTS

| 4,056,068 A | 11/1977 | Hafeli |
| 4,356,778 A * | 11/1982 | McRee, Jr. ..................... 110/244 |

(Continued)

FOREIGN PATENT DOCUMENTS

| DE | 4219231 | 10/1993 |
| DE | 19910530 | 9/2000 |

(Continued)

OTHER PUBLICATIONS

Horttanainen M et al., "Ignition Front Propagation in Packed Bed of Wood Particles", In: IFRF Combustion Journal, Article No. 200003, May 2000, ISSN 1562-479X.

(Continued)

*Primary Examiner* — Kenneth Rinehart
*Assistant Examiner* — David J Laux
(74) *Attorney, Agent, or Firm* — Leydig, Voit & Mayer, Ltd.

(57) ABSTRACT

Method for reducing a formation of nitrogen oxide on a primary side of a furnace and reducing or avoiding nitrous oxide and ammonia slip in an offgas of the furnace in which a fuel is burned in a combustion process having at least two stages. The method includes passing a fuel consecutively through each of a plurality of bed areas of a combustion bed of the furnace. A primary gas including oxygen is fed individually to each of the bed areas so as to burn the fuel in the combustion chamber of the furnace. A secondary gas including oxygen is introduced into a downstream offgas burn-out zone, so as to after-burn incompletely burned offgas components formed during the burning of the fuel. Partial offgas streams from the combustion bed areas are axially mixed by injecting a water-gas mixture as at least one free jet above a surface of the combustion bed upstream from the downstream offgas burn-out zone so that the at least one free jet penetrates the partial offgas streams of the combustion bed areas to reduce a heating value of the offgas between the surface of the combustion bed and the downstream offgas burn-out zone.

22 Claims, 9 Drawing Sheets

(56) References Cited

U.S. PATENT DOCUMENTS

| | | | |
|---|---|---|---|
| 5,271,339 A | * 12/1993 | Yamagishi et al. | ........... 110/281 |
| 5,307,746 A | 5/1994 | Khinkis et al. | |
| 5,313,895 A | * 5/1994 | Sekiguchi et al. | ........... 110/346 |

FOREIGN PATENT DOCUMENTS

| | | |
|---|---|---|
| DE | 19917572 | 10/2000 |
| EP | 0573756 | 12/1993 |
| EP | 0805307 | 11/1997 |
| EP | 1046861 | 10/2000 |
| EP | 1164331 | 12/2001 |
| EP | 1382906 | 1/2004 |
| WO | 9958902 | 11/1999 |

OTHER PUBLICATIONS

Hunsinger H. et al.: "Formation of Pollutants during Municipal Solid Waste Incineration in a Grate Furnace under Different Air/ Fuel Ratios". Proc. IT3'02 Conference in New Orleans, Louisiana, May 13-17, 2002.

Hunsinger H. et al., "Performance of a Pilot Waste Incinerator under Different Air/ Fuel Ratios". IT3'00 Conference in Portland, Oregon, May 8-12, 2000.

* cited by examiner

METHOD FOR REDUCING NITROGEN OXIDE ON THE PRIMARY SIDE IN A TWO-STAGE COMBUSTION PROCESS

CROSS REFERENCE TO PRIOR APPLICATIONS

This application is a U.S. National Phase application under 35 U.S.C. §371 of International Application No. PCT/EP2007/000441, filed on Jan. 18, 2007 and claims benefit to German Patent Application No. DE 10 2006 005 464.4, filed on Feb. 7, 2006. The International Application was published in German on Aug. 16, 2007 as WO 2007/090510 A1 Under PCT Article 21(2) present.

FIELD

The present invention relates to a method for reducing the formation of nitrogen oxide ($NO_x$) on the primary side while concurrently avoiding nitrous oxide ($N_2O$) and ammonia slip ($NH_3$) in the offgas of a two-stage combustion process.

BACKGROUND

In combustion processes, especially in grate-fired furnaces, the thermal formation of nitrogen oxide (NO, formation) from nitrogen in the air is negligibly small due to the relatively low temperature level. When fuels containing nitrogen are burned in these furnaces, nitrogen oxides are formed largely from the nitrogen bonded in the fuel.

The burn-out of solid fuels such as waste, biomass or coal on combustion grates can be divided in an idealized manner into the consecutive partial processes of drying, de-gassing and burn-out of the solid carbon. In industrial grate-fired furnaces, these partial processes overlap. During the de-gassing phase, not only the hydrocarbons but also the nitrogen compounds—especially $NH_3$ (ammonia) and HCN (hydrogen cyanide)—that are formed primarily from the fuel nitrogen are released into the offgas. The concentration of hydrocarbons in the offgas directly above the grate, particularly in the area of the main combustion zone of the incineration system, is so high that the amount of oxygen fed locally there via the primary air is not sufficient to bring about a complete burn-out of the offgas. The offgas exiting from the combustion bed in this zone has high offgas temperatures and is practically oxygen-free. Under these conditions, carbon monoxide (CO) and hydrogen ($H_2$) are formed via gasification reactions. Consequently, it is also in this area that the highest concentrations are found of high-heating-value offgas components such as hydrocarbons, carbon monoxide or hydrogen, along with the nitrogen species that are formed primarily from the fuel nitrogen, mainly ammonia ($NH_3$) and hydrogen cyanide (HCN) as well as, in much smaller quantities, organic compounds containing nitrogen such as, for instance, pyridine and aniline.

Normally, in the case of the above-mentioned incomplete combustion due to a lack of oxygen, after-burning is initiated by adding secondary air to the still high-heating-value offgas. This gives rise to very high temperature peaks locally, whereby NO or $N_2$ are ultimately formed from the above-mentioned $NH_3$ and HCN compounds under the oxidizing conditions via complex reactions during the offgas burn-out. The objective is to modify the control of this process in such a way that the primary nitrogen species $NH_3$ and HCN are completely degraded and that $N_2$ is preferably formed as the final product, at the expense of the formation of nitrogen oxide while, at the same time, avoiding the formation of $N_2O$.

M. V. A. Horttanainen, J. J. Saastamoinen, P. J. Sarkomaa: Ignition Front Propagation in Packed Bed of Wood Particles; IFRF Combustion Journal, Article No. 200003, May 2000, ISSN 1562-479X, describes the dependence of the burn-out rate on the primary air volume during the burn-out of solids. Depending on the properties of the fuel, particularly on the heating value, the burn-out rate displays a maximum at a certain primary air volume. A further increase in the primary air volume beyond this maximum, in contrast, causes the combustion bed to cool down. The reduced or delayed release of volatile fractions from the fuel that is associated with the cooling as well as the dilution of the combustion gases with the fed-in primary air cause a locally reduced release and thus a diminished concentration of hydrocarbons, CO and $H_2$. H. Hunsinger, K. Jay, J. Vehlow: Formation of Pollutants during Municipal Solid Waste Incineration in a Grate Furnace under Different Air/Fuel Ratios; Proc. IT3 '02 Conference, May 13-17, 2002, New Orleans, La. and H. Hunsinger, J. Vehlow, B. Peters, H. H. Frey: Performance of a Pilot Waste Incinerator under Different Air/Fuel Ratios; IT3 '00 Conference, May 8-12, 2000, Portland, Oreg., both of which describe this measure in conjunction with the additional information that a high feed of primary air with a concurrent low feed of secondary air (constant sum of primary and secondary air) fundamentally lead to low NO values in the combustion offgases.

The injection of water for purposes of reducing the formation of PCDD/F in waste incineration plants is proposed in U.S. Pat. No. 5,313,895. An advantage is postulated to be the reduction in $NO_x$ formation due to the temperature drop caused by the injection of water. All of the offgas temperatures cited in U.S. Pat. No. 5,313,895 refer to the area before the gas enters the offgas burn-out zone and said temperatures are between 800° C. and 950° C. or 970° C. [1472° F. and 1742° F. or 1778° F.]. Unfortunately, however, detailed $NO_x$ values and $NO_x$ reduction rates are not given. Moreover, there is no information about other pollutants containing nitrogen, especially $N_2O$ and $NH_3$.

Lowering the offgas temperatures to below 950° C. [1742° F.] after it has left the offgas burn-out zone, however, leads to incomplete degradation of the primarily formed $NH_3$ (ammonia) and also to the formation of $N_2O$ (laughing gas), both of which escape into the atmosphere as strong greenhouse gases if they are not treated within the scope of additional process steps, for example, with catalysts.

The temperature reduction to 800° C. to 950° C. [1472° F. to 1742° F.] mentioned in U.S. Pat. No. 5,313,895 resulting from the addition of water, however, causes a drop in performance, even if the heat is utilized downstream, for instance, in order to heat up a boiler.

The same effect is achieved by moistening the fuel, which reduces the heating value of the fuel. The maximum of the burn-out rate is already exceeded at small primary air volumes. The burn-out of the solids extends over a long grate area, whereby the heating values of the gas as well as the offgas temperatures become established at a low level before the gas enters the offgas burn-out zone. The above-mentioned effects occur here as well.

SUMMARY

It is an aspect of the present invention to provide a simply and reliably controllable method that can be used more efficiently to reduce pollutants containing nitrogen, especially the formation of nitrogen oxide, on the primary side in industrial furnaces, for example, grate-fired furnaces. In this context, it is desirable that the method does not cause the formation of other pollutants such as, for instance, $N_2O$, that $NH_3$ slip is avoided and/or that the energetic utilization of the heat content of the combustion offgases and the quality of the slag are not significantly diminished.

In an embodiment, the present invention provides a method for reducing a formation of nitrogen oxide on a primary side of a furnace and reducing or avoiding nitrous oxide and ammonia slip in an offgas of the furnace in which a fuel is burned in a combustion process having at least two stages. The method includes passing a fuel consecutively through each of a plurality of bed areas of a combustion bed of the furnace. A primary gas including oxygen is fed individually to each of the bed areas so as to burn the fuel in the combustion chamber of the furnace. A secondary gas including oxygen is introduced into a downstream offgas burn-out zone, so as to after-burn incompletely burned offgas components formed during the burning of the fuel. Partial offgas streams from the combustion bed areas are axially mixed by injecting a water-gas mixture as at least one free jet above a surface of the combustion bed upstream from the downstream offgas burn-out zone so that the at least one free jet penetrates the partial offgas streams of the combustion bed areas to reduce a heating value of the offgas between the surface of the combustion bed and the downstream offgas burn-out.

BRIEF DESCRIPTION OF THE DRAWINGS

The present invention is described in greater detail below on the basis of exemplary embodiments and of the figures cited below. The following is shown.

DETAILED DESCRIPTION

The present invention relates to a method for reducing the formation of nitrogen oxide ($NO_x$) on the primary side while concurrently avoiding nitrous oxide ($N_2O$) and ammonia slip ($NH_3$) in the offgas of a two-stage combustion process, including a fixed-bed burn-out zone through which a primary gas containing oxygen flows and a downstream offgas burn-out zone into which a secondary gas containing oxygen is additionally introduced, according to the first patent claim.

The present invention also serves to improve the quality of the slag by reducing the chloride concentration in the grate ash.

In an embodiment, a method is proposed for reducing the formation of nitrogen oxide on the primary side in a two-stage combustion process, that is to say, a process comprising a fixed-bed burn-out zone and an offgas burn-out zone located downstream in the offgas exhaust system. Here, the actual combustion of the solid fuel takes place in the fixed-bed burn-out zone, while after-burning of the incompletely burned offgas components takes place in the offgas burn-out zone. In such combustion processes, a primary gas containing oxygen is introduced into the fixed-bed burn-out zone and a secondary gas that likewise contains oxygen is introduced into the offgas burn-out zone for purposes of after-burning.

An aspect of the present invention is to provide a reduction in the heating value of the combustion gases before they enter the offgas burn-out zone, namely, in such a way that, as a result, a reduction in the formation of nitrogen oxide is achieved but, on the other hand, the offgas temperature is not concurrently lowered locally to such an extent as to cause the formation of pollutants such as, for instance, $N_2O$, or an incomplete degradation of $NH_3$. Towards this end, it is advisable to precisely maintain a certain state of the offgas. On the one hand, in order to prevent the formation of nitrogen oxide, the offgas or even only parts of it should not exceed a certain limit heating value, for example 1.5 MJ/m³ or 1.0 MJ/m³ and, on the other hand, the temperature of the offgas after it has left the offgas burn-out zone should not fall below 1000° C. [1832° F.], for example not below 980° C. [1796° F.] or 950° C. [1742° F.], for purposes of limiting pollutants containing nitrogen, especially $N_2O$ and $NH_3$, not only integrally but also in certain areas. An aspect of the present invention is to systematically regulate or set the heating value and the temperature of the offgas by means of suitable measures and to attain a systematic homogenization by means of these measures.

One possibility is to inject a water-gas mixture upstream from the offgas burn-out zone. This translates into a systematic reduction in the heating value of the offgas immediately after the fixed-bed combustion (on the combustion bed) with a concurrent homogenization of the gases between the combustion bed and the offgas burn-out zone, in other words, not of the heating value of the solid fuel itself. The injection can be carried out in the form of a free jet characterized by a lower volume flow on the one hand and by a high velocity on the other hand.

The injection of a water-gas mixture advantageously directly affects the heating value of the offgas and not the solid fuel, namely, not only in terms of a reduction of the heating value but also in terms of a homogenization of the heating value.

A high heating value of the offgas in an area directly above the combustion bed correlates with the magnitude of the formation of nitrogen oxide. In this context, the above-mentioned high NO formation rate is caused by the maxima of the axial concentration profiles as well as by a broad distribution of these maxima of the high-heating-value offgas components, namely, $C_nH_m$ (hydrocarbons), CO and $H_2$, that is to say, a high integral mean value over the grate length. An aspect of the present invention is to provide a suitable technical measure to both reduce and homogenize the heating value of the offgas before the burn-out of the offgas, thereby reducing the maxima and the breadth of the distribution and thus minimizing the formation of NO.

If the combustion process takes place in a grate-fired furnace, the fuel continuously passes through the entire fixed-bed burn-out zone on a grate serving as the combustion bed, said fixed-bed burn-out zone being divided into individual fixed-bed areas arranged one after the other. The front half of the grate constitutes the fixed-bed areas through which the fuel passes first while, as the combustion proceeds, the fuel is transported into subsequent fixed-bed areas of the rear half of the grate, and from there to an outlet for the solid combustion residues. Here, the fixed-bed burn-out zone is arranged in a combustion chamber, and each of the combustion bed areas is provided with its own feed of primary gas. The secondary gas containing oxygen may be fed into the offgas burn-out zone, for example in a shared offgas exhaust system for all of the combustion bed areas. The water-gas mixture may be injected in the form of a free jet directly into the combustion gas above the surface of the combustion bed into the combustion chamber, in other words, upstream from the offgas burn-out zone, whereby the jet axially penetrates all of the combustion bed areas and comes into contact with and mixes the combustion gases immediately after they are formed.

Suitable water-gas mixtures include all mixtures consisting of water or aqueous solutions with a gas such as, for example, a water-air, water-offgas or water-steam mixture. Within the scope of the present invention, aqueous solutions can also contain dissolved re-circulated pollutants stemming from other cleaning measures (e.g. from cleaning scrubbers).

The water-gas mixture can be injected either continuously or in pulses at a high velocity or pulse strength, so that the jet axially penetrates the gas space above the combustion-bed surface over all of the grate zones. For purposes of generating the jet, two-fluid nozzles at a jet angle smaller than 15°, for example between 3° and 10°, can be used.

The water and gas fractions can also be injected separately by means of their own one-fluid nozzles, whereby, with an eye towards the above-mentioned homogenization of the combustion gases, the injection should be configured in such a way as to ensure that the two one-fluid jets strike each other and mix with each other as well with the combustion gases in the combustion space.

The gas fraction of the water-gas mixture injected via the jet should not exceed 10% of the total volume of combustion air introduced, which consist essentially of the primary gas and the secondary gas. A higher fraction may cause, for example, a higher release rate of dust into the offgas. Increasing mass flow may result in an increased cooling of the combustion gases and, above a given level, this can affect the burn-out of the offgas. Cooling the offgas by adding water may lead to a reduced energetic utilization of the offgas heat in the case of steam generation and consequently should be kept to a minimum whenever possible.

The temperatures upstream from the offgas burn-out zone should be above 970° C. [1778° F.] and, downstream from the offgas burn-out zone, above 950° C. [1742° F.], so that no undesired pollutants such as the greenhouse gas $N_2O$ or a slip of primarily formed $NH_3$ can occur in the burned-out offgas.

Below a temperature of 950° C. [1742° F.] downstream from the offgas burn-out zone, the $N_2O$ concentration rises exponentially as the temperature drops. $N_2O$ is a strong greenhouse gas and should therefore be avoided. Above 950° C. [1742° F.], the primarily formed $NH_3$ is practically completely degraded in the offgas burn-out zone.

The amount of water to be fed in via the jet can be determined and regulated by the NO concentration permitted (for example, statutory limit values) in the offgas downstream from the offgas burn-out zone, that is to say, indirectly via the mean temperature of the combustion gas (offgas) downstream from the offgas burn-out zone in the combustion chamber. In this context, a minimum temperature starting approximately about 950° C. [1742° F.] in the offgas downstream from the offgas burn-out zone can demarcate the upper limit of the mass flow of water.

Another alternative or additional measure to lower the heating value of the offgas while concurrently ensuring one of the above-mentioned minimum offgas temperatures comprises setting the primary gas feed in such a manner that a combustion stoichiometry between 0.6 and 1.2, for example less than 1.0 or between 0.7 and 0.9, is established in the primary combustion zone. The volume of combustion air and the volume of primary air can be approximately calculated from the offgas composition (e.g. $CO_2$, $O_2$, $H_2O$) and from the offgas volume.

As an alternative to this, another measure for the above-mentioned purpose involves a systematically adjustable and/or regulatable transport speed in the combustion bed, whereby, in the front half of the grate, the transport speed is, for example, at least 50% higher than in the rear half of the grate, whereby the dwell time of the solid (fuel) on the grate is dimensioned such that more than 99% of the grate ash burns out. The basic idea behind this measure is to control the offgas emission generated when a material is burned in a fixed bed and to distribute this emission over the combustion bed surface in such a way that the offgas has a low heating value above each of the combustion bed areas. In this context, this measure distributes the release of high-heating-value gases over a larger grate surface area, thus markedly reducing the maximum value of the axial heating value profile of the offgas above the combustion bed. This spatial extension of the release of high-heating-value gases may improve the gas burn-out already in the combustion bed with the primary air fed in since more oxygen is locally available for the oxidation (larger grate area—$m^3$ of air/$m^2$ of grate surface area=constant), thus bringing about a reduction in the integral mean value of the axial heating value profile.

Low heating values in the offgas (relative to the mean value and to the maximum value of the offgas heating value profile in the cross section of the stream) between the combustion-bed surface and before the addition of secondary air correlate with low $NO_x$ emission values. Therefore, efforts should be aimed at attaining generally low gas heating values before the addition of secondary air, whereby the measures proposed above, either on their own or in combination with each other, ensure a low release of dust from the combustion bed as well as a good burn-out of the slag and offgas. In particular, this makes it possible to achieve low $NO_x$ emission values without a significant increase in the formation of $N_2O$, whereby the absence of a slip of primarily formed $NH_3$ presupposes sufficiently high temperatures in the offgas burn-out zone when said secondary air is added.

The present invention and its advantageous embodiments preferably demonstrate the following:

The primary air ratios (stoichiometry) can be set below 1.0, for example between 0.7 and 0.9, in order to attain a low release of dust.

The secondary gas can be set in such a way that an oxygen excess of at least 6%, for example approximately 10%, remains downstream from the offgas burn-out zone, as a function of the fuel heating value and of the fuel moisture.

The total dwell time of the fuel on the grate can be dimensioned in such a way that a good burn-out of the slag is ensured, whereby a higher transport speed can be established in the front half of the grate than in the rear half of the grate.

The axial mixing of the combustion gases in the combustion chamber by means of a small amount of water/air can be carried out with finely dispersed water using a two-fluid nozzle. The free jet from a liquid/gas mixture penetrates the combustion space at a high pulse level in the axial direction (that is to say, usually extending horizontally and over all areas of the combustion bed). As a result, the offgas can be mixed and the heating value can be lowered in the combustion space.

The water volume of the water-gas jet can be regulated as a function of the ascertained, for example measured, $NO_x$ concentration in the offgas downstream from the offgas burn-out zone or downstream from the boiler.

The maximum water volume can be limited by the ascertained, for example measured, minimum offgas temperature of 950° C. [1742° F.] downstream from the offgas burn-out zone. The temperature upstream from the offgas burn-out zone should not fall below 970° C. [1778° F.].

The loss of the heat quantity needed for downstream heat utilization in a boiler remains moderate with a low addition of water, for example below 50 g/Nm³ of offgas or below 30 g/Nm³ of offgas.

Figure 1:
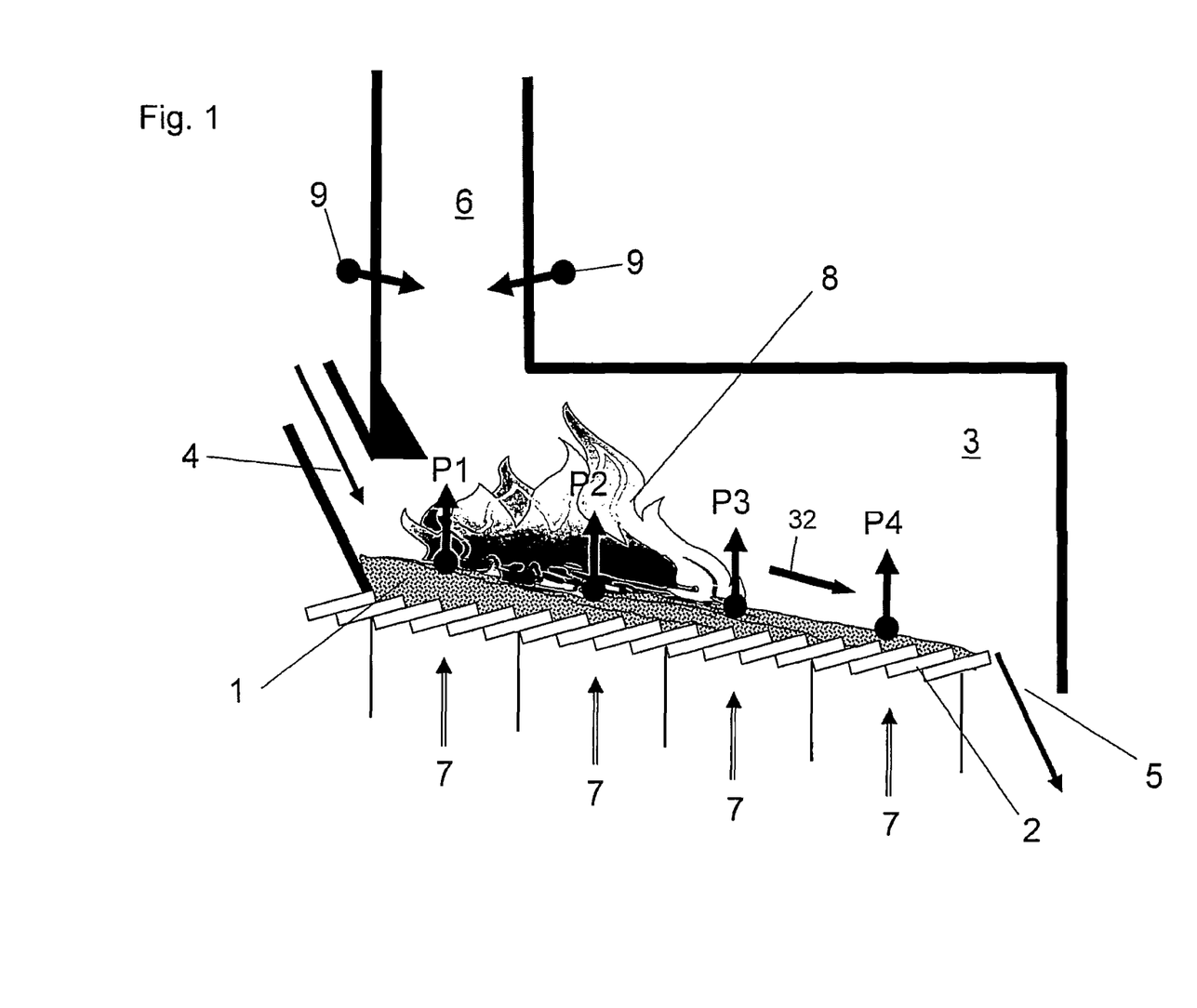
FIG. 1—a cross section of a conventional grate-fired furnace with four combustion bed areas $P_1$ to $P_4$.
Figure 2:
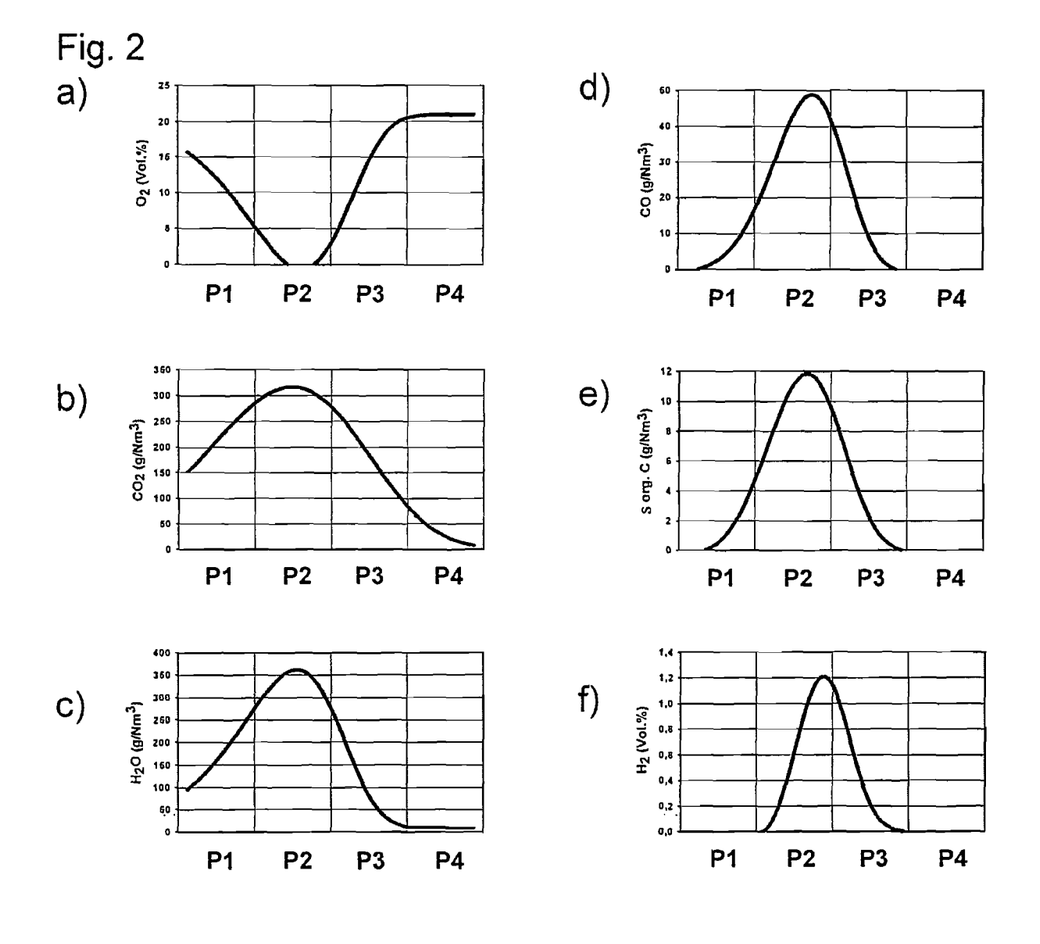
FIGS. 2a to 2f—the measured axial concentration profiles of $O_2$, $CO_2$, $H_2O$, CO, organic carbon compounds (sum S of organic C) and $H_2$ in the offgas above the combustion bed of a conventional grate-fired furnace.

A conventional grate-fired furnace, as depicted in FIG. 1, consists essentially of a combustion bed 1 on a firing grate 2 in a combustion chamber 3 having an inlet 4 for fuel, an outlet 5 (see fuel transport device 32) for slag or other solid combustion products as well as an offgas burn-out zone 6 downstream from the combustion chamber in the offgas exhaust system. The combustion bed 1 consists essentially of a solid fuel. The combustion chamber 3 covers all of the combustion bed areas $P_1$ to $P_4$ through which the fuel in the combustion bed consecutively passes and a primary gas feed 7 containing oxygen for each individual combustion bed area flows through the grate in each of the combustion bed areas $P_1$ to $P_4$. In this context, $P_1$ and $P_2$ form the front half of the grate, while $P_3$ and $P_4$ form the rear half of the grate. The above-mentioned injection 9 of secondary gas containing oxygen takes place in the downstream offgas burn-out zone 6 in the offgas exhaust system.

The combustion 8 of the solid fuel (a symbolic flame in FIG. 1) takes place essentially in the area of the combustion bed $P_2$ and, by nature, different combustion states occur in the combustion bed areas $P_1$ to $P_4$, that can be ascribed particularly to the progress of the combustion and the temperature of the fuel. FIGS. 2a to 2f provide examples of measured concentration profiles of the offgas components oxygen $O_2$ (a), carbon dioxide $CO_2$ (b), water $H_2O$ (c), carbon monoxide (d), organic hydrocarbons compounds (e) as well as hydrogen $H_2$ (f) in the combustion chamber 3 directly above the combustion bed 1, plotted over the combustion areas $P_1$ to $P_4$. During the combustion, a degasification of the volatile fuel constituents occurs, especially of hydrocarbons $C_nH_m$ (see FIG. 2e). The hydrocarbon concentration in the offgas in the area of the main combustion zone (combustion bed area $P_2$) is so high here that the locally fed-in oxygen (FIG. 2a) is not sufficient to bring about a complete offgas burn-out. The oxygen concentration here can even drop all the way to zero. This is the place where the highest concentrations of high-heating-value offgas components tend to be found, namely $C_nH_m$, CO and hydrogen (FIGS. 2d, 2e and 2f), namely, together with the primary nitrogen species ($NH_3$, HCN and small amounts of hydrocarbons containing nitrogen). Water (FIG. 2c) is formed due to evaporation or drying, or else due to the partial combustion of hydrocarbons and, in the area upstream from and extending to the main combustion zone, tends to exit from the combustion bed, then dropping to a minimum in the combustion bed areas ($P_4$) that follow. Carbon dioxide (FIG. 2b) is formed during the combustion in all of the combustion bed areas approximately proportionally to the intensity of the burn-out.

Figure 3A:
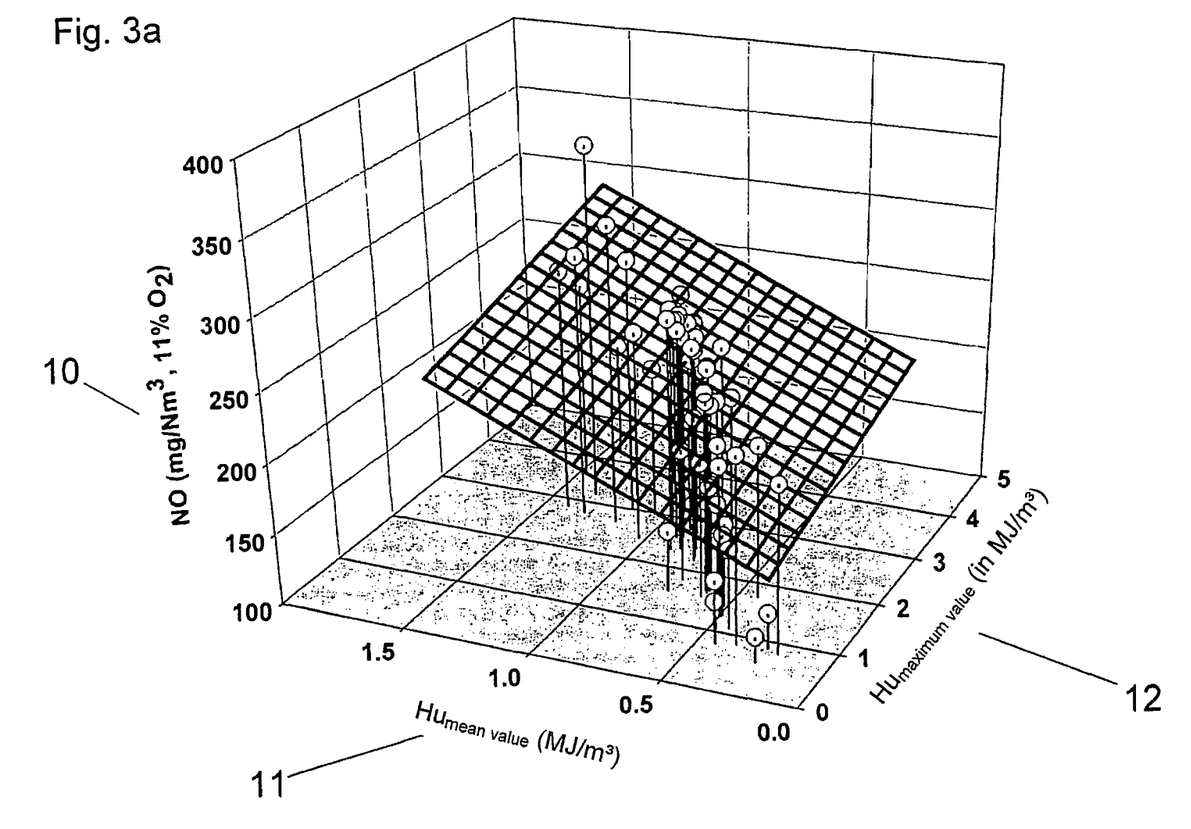
FIGS. 3a and 3b—measured nitrogen oxide concentrations 10 in the combustion bed as a function of the offgas heating values 11 and 12 (*a*) or of the stoichiometry 17 (primary air ratio) and moving grate speed 18 (*b*)
Figure 3B:
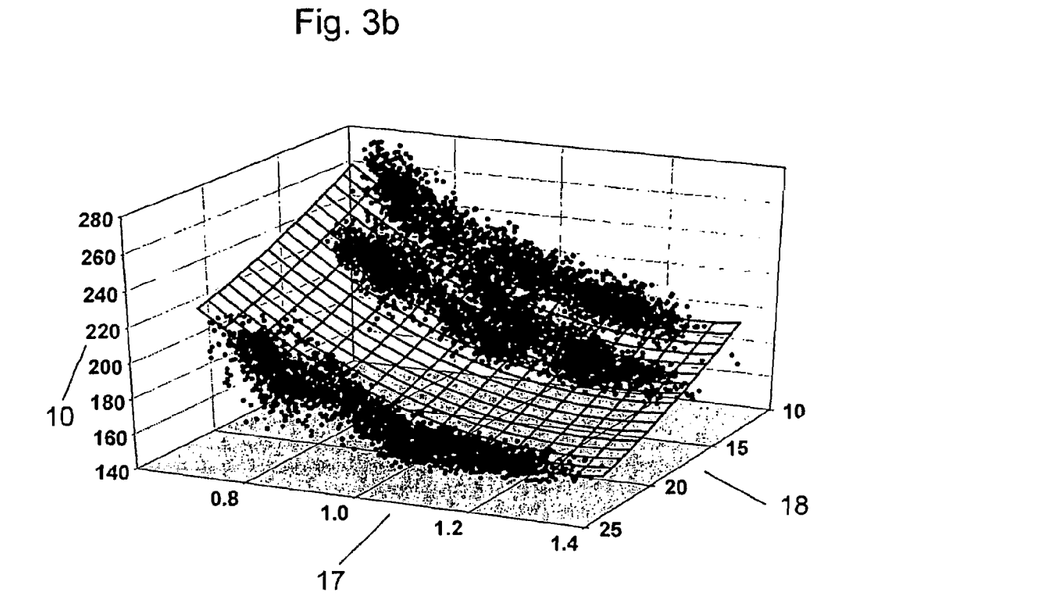

FIGS. 3a and 3b each show a characteristic diagram of the nitrogen oxide concentration 10 (in mg/Nm³, standardized to 11% $O_2$) in the offgas downstream from the boiler, ascertained in a waste incineration pilot plant (TAMARA) as a function of several influencing factors. The offgas temperatures in FIG. 3b downstream from the offgas burn-out zone (after the addition of secondary air) were set at a constant value of approximately 1050° C.±40° C. [1922° F.±72° F.] in both cases.

On the basis of a number of experiments with different combustion parameters such as the heating value of the solid fuel, the primary air ratio and the grate kinematics, FIG. 3a depicts a characteristic diagram of the nitrogen oxide concentration 10 (in mg/Nm³, 11% $O_2$) in the offgas downstream from the boiler, as a function of the offgas heating values above the combustion bed, namely, averaged over the mean heating value $Hu_{mean\ value}$ 11 (in MJ/m³), that is to say, over the grate length (integral mean value) as well as over the maximum heating value $Hu_{maximum\ value}$ 12 (in MJ/m³). All of the combustion parameters influence the axial heating value profiles of the gas above the combustion bed. The maximum values and the breadth of the heating value profiles of the gas correlate with the $NO_x$ concentrations. The lowest NO values are observed at low mean heating values and low maximum heating values. Therefore, an object is to employ suitable measures to set low gas heating values in the offgas between the combustion bed surface and before the secondary air injection.

FIG. 3b depicts the characteristic diagram of the nitrogen oxide concentration 10 (in mg/Nm³, 11% $O_2$) in the offgas downstream from the boiler, as a function of the stoichiometry (dimensionless primary air ratio 17) as well as of the moving grate speed 18 in cm/min, which is set at the same value in all of the grate zones (household waste Hu 7 to 8 MJ/kg). This characteristic diagram also has an unambiguous area with an extremely low nitrogen oxide concentration whereby, in contrast to the rise in the nitrogen oxide concentration in FIG. 3a, the rise in the characteristic diagram shown here does not take place linearly but rather approximately exponentially. As the stoichiometry increases, the formation of nitrogen oxide advantageously drops steadily. However, stoichiometries above 1.0 may increase the release of dust into the offgas, perhaps for reasons such as the associated contamination of the boiler or the increased accumulation of fly ash in the dust extractor.

Figure 4:
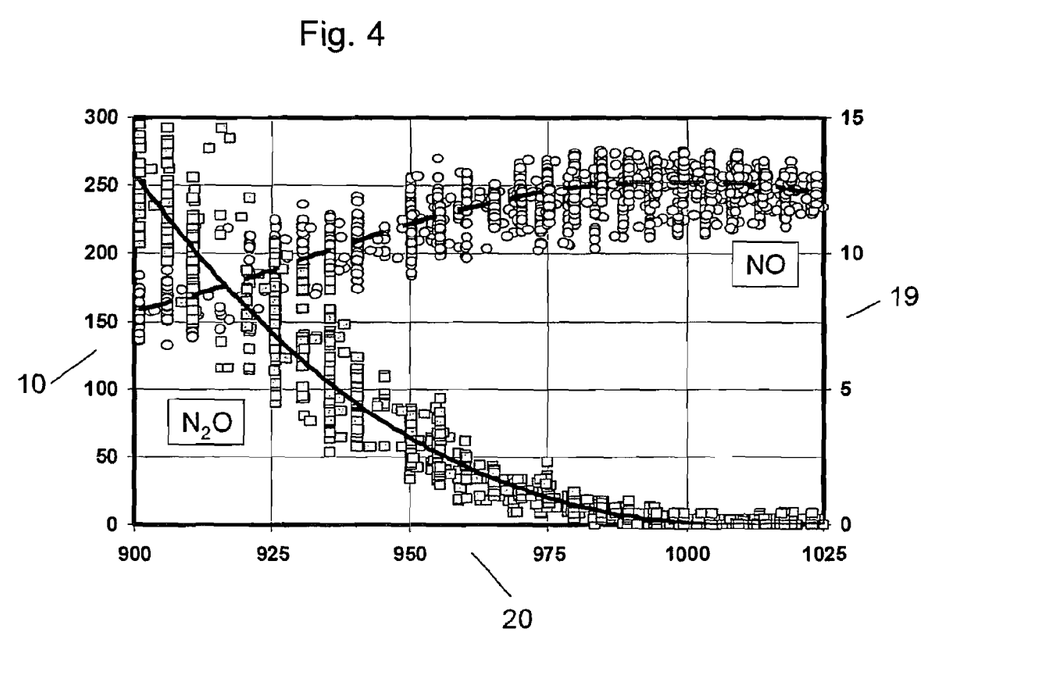
FIG. 4—measured values of the laughing gas concentration ($N_2O$) 19 and of the nitrogen oxide concentration (NO) 10 in the offgas as a function of the offgas temperature 20 as it leaves the offgas burn-out zone.

FIG. 4 depicts the laughing gas concentration 19 ($N_2O$ formation in mg/Nm³, 11% $O_2$) as a function of the offgas temperature 20 in ° C., downstream from the offgas burn-out zone. Below a limit temperature of approximately 950° C. [1742° F.] downstream from the offgas burn-out zone, a significant rise in the concentration of laughing gas might be expected. Therefore, when the heating value of the offgas is lowered for purposes of reducing the emission of pollutants containing nitrogen, the offgas temperature downstream from the offgas burn-out zone should be set higher than the above-mentioned limit temperature so that the reduced emission of nitrogen compounds and thus the higher fraction of bound nitrogen retained in the offgas or fuel are not shifted towards a greater emission of laughing gas.

The reduction of the gas heating values in the offgas takes place within the scope of the present invention by appropriately setting the air distribution/grate kinematics and the axial mixing of the offgas streams from the individual combustion bed areas (grate zones) $P_1$ to $P_4$ in the combustion chamber 3 before the addition of secondary gas 9 with the concurrent addition of water droplets. Technically, this can be done by means of a two-fluid nozzle 13 with a jet 14 of a water-gas mixture within the scope of the embodiment according to FIG. 5; for the rest, the set-up corresponds to the design according to FIG. 1. The two-fluid nozzle 13 can be positioned from the rear of the combustion space 3. The jet angle can be, for example, small, that is to say, less than 15° or less than 10°. At a high pressure, a small air volume flow can be injected (for example 10% of the offgas throughput rate, typically 12 to 15 Nm³/h at an offgas throughput rate of, for instance, 400 Nm³/h above the combustion bed). The resulting high pulse level (product of the weight and velocity of the free jet) may cause the free jet 14 to penetrate the combustion chamber 3 and lead to an intensive mixing of high-heating-value and low-heating-value gases from the individual combustion-bed zones or grate zones inside the combustion chamber in the area upstream from the offgas burn-out zone 6 in the case of the secondary gas injection 9. Due to the mixing of the oxygen-free and high-heating-value gases from the main combustion zone with the oxygen-rich and low-heating-value gases from the grate zones upstream and downstream from the main combustion zone, the high-heating-value gas components are already partially burned out before reaching the offgas burn-out zone. The efficiency depends on the primary air ratio and on the mixing quality. The burn-out causes the combustion chamber temperature to rise. A two-fluid nozzle 13 can be used to additionally feed finely atomized water into the area of the combustion 8. This causes the heating value in the offgas to drop, ideally by the evaporation enthalpy of the water droplets. At the same time, this lowers the temperature downstream from the offgas burn-out zone.

The process of effective mixing in conjunction with a minimum volume flow of the introduced water-gas mixture can be individually optimized to the geometry of the combustion chamber by adjusting the primary gas stoichiometry, the grate kinematics and the positioning of the two-fluid nozzle, as an alternative also by means of the above-mentioned individual nozzles for the water and gas or by several free jet nozzles.

The present invention will explained in greater detail below with reference to experiment examples:

Experiment Example 1

The experiments of this example serve to ascertain the optimal combustion parameters.

In these experiments, waste having a lower heating value Hu of about 7 to 8 MJ/kg was incinerated in the above-mentioned TAMARA waste incineration pilot plant. The oxygen content in the offgas downstream from the boiler was constant at approximately 10 vol-% dry, the offgas temperatures downstream from the offgas burn-out zone were likewise constant between 1050° C. and 1100° C. [1922° F. and 2012° F.]. A reduction in the primary air was compensated for by an appropriately regulated increase in the secondary air feed, whereby the oxygen excess downstream from the afterburning chamber was kept constant. The experiments were carried out with three different grate speeds. The results are shown in FIG. 3b.

As the primary air ratio 17 (stoichiometry) and/or the moving grate speed 18 increase, the nitrogen oxide concentration 10 in the offgas drops (see FIG. 3a), but so does the heating value of the combustion offgases above the combustion bed. In this context, further increasing, for example, the primary air ratio in that area to above 1.0, especially at high moving grate speeds, does not bring about any further reduction in nitrogen oxide formation, but causes an undesired, high release of dust into the offgas.

A high moving grate speed in all of the grate zones concurrently translates into a short dwell time of the solid fuel in the combustion bed on the firing grate, as a result of which the slag burn-out quality also diminishes.

Further experiments have shown that a low rate of release of nitrogen oxide especially correlates with an increase in the moving grate speed in the front half of the grate, where the volatile constituents and the primary nitrogen compounds $NH_3$ and HCN are released. The moving grate speed at the end of the grate does not have any influence on the formation of $NO_R$. The moving grate speed in the rear half of the grate correlates especially with the quality of the slag burn-out. In the rear half of the grate, as the moving grate speed drops, the fuel has more time for a more complete burn-out and thus for an improving slag burn-out quality.

Experiment Example 2

As was the case in the first experiment example, the incineration was carried out in the TAMARA waste incineration pilot plant. The fuel feed was set in such a manner that the combustible fraction of the solid was constant, as a result of which a constant oxygen fraction in the offgas between 11 vol-% and 11.5 vol-% was established in the offgas after it had left the offgas burn-out zone.

Within the scope of this experiment example, the heating value of the solid fuel $Hud_{fuel}$ was reduced from 12 to 6 MJ/kg by moistening the fuel. The constant load of combustible constituents (constant carbon load) was compensated for by an increase in the fuel feed corresponding to the increase in moisture. The primary air ratio was set at an approximately constant 1.0 and, by the same token, the moving grate speed was set at 10 cm/min in all of the combustion bed areas.

The fuel burn-out, with moisture increase in the waste, takes place over a large area of the grate and it automatically moves downstream. At the same time, the combustion chamber temperatures drop as the heating value of the fuel $Hu_{fuel}$ diminishes. The heating value of the gas $Hu_{gas}$ above the combustion bed sinks in parallel (the integral mean value as well as the maximum value of the axial profile). The measured laughing gas concentration 19 ($N_2O$) and the nitrogen oxide concentration 10 in the offgas after it has left the offgas burn-out zone are depicted in FIG. 4 over the offgas temperature 20 measured at the same place. The temperature in the offgas downstream from the offgas burn-out zone drops as the water feed increases. As expected, this brings about a significant reduction in $NO_x$ formation (nitrogen oxide concentration 10). However, below about 950° C. [1742° F.], an undesired, significant rise in the laughing gas concentration 19 occurs. Moreover, moistening the fuel fundamentally leads to a prolongation of the burn-out time of the fuel on the grate. The quality of the slag also drops due to lower temperatures in the combustion bed at high levels of fuel moisture.

A reduction in the $NO_x$ formation caused by a lowering of the temperature in the offgas to below 950° C. [1742° F.] downstream from the offgas burn-out zone comes at the expense of a marked increase in the formation of $N_2O$.

Experiment Example 3

Household waste is incinerated in the above-mentioned TAMARA pilot plant.

Figure 6:
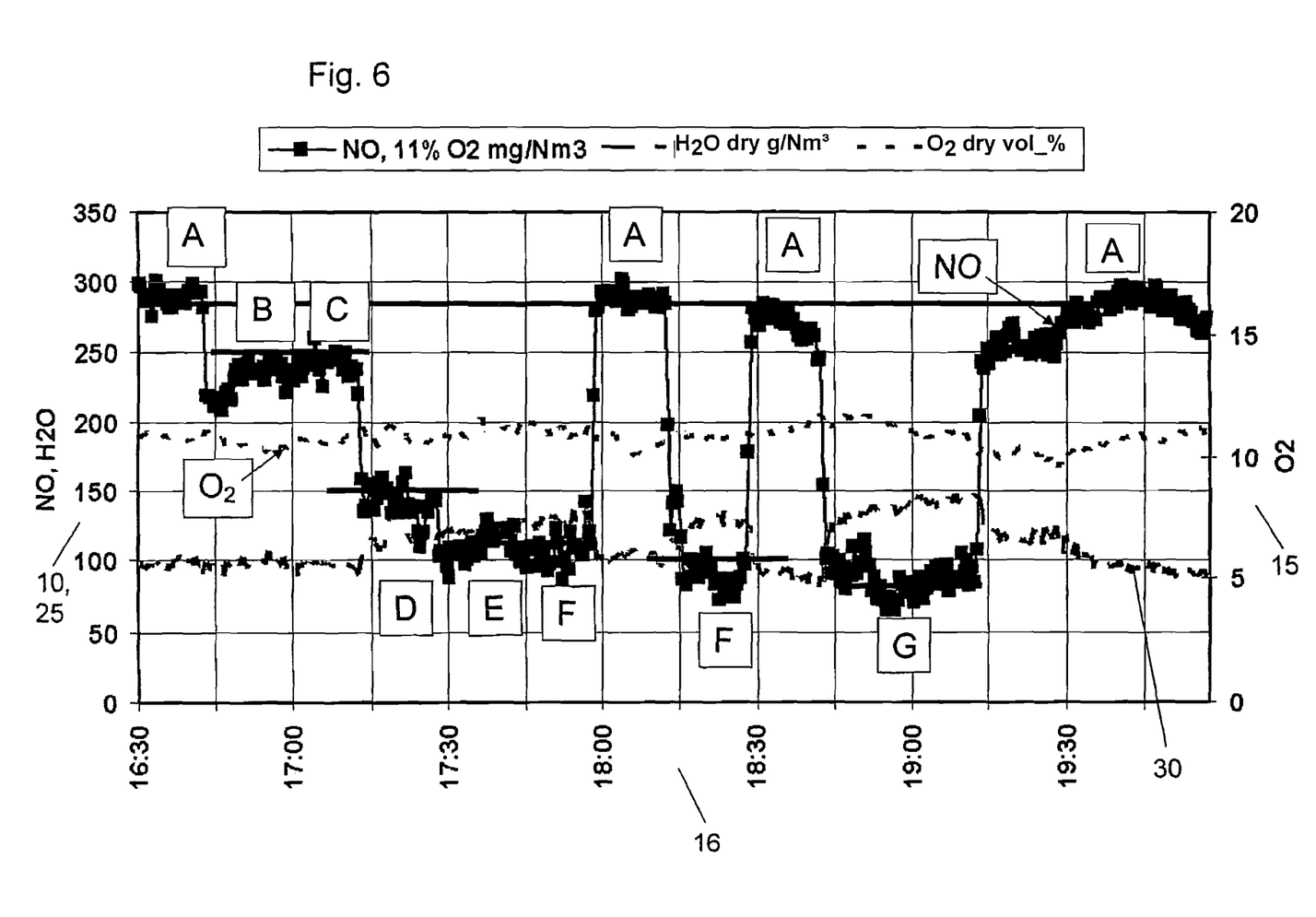
FIG. 6—the nitrogen oxide concentrations in the offgas of a grate-fired furnace according to FIG. 5, ascertained within the scope of a series of experiments.

FIG. 6 depicts the nitrogen oxide concentrations 10 (NO) and the oxygen concentrations 15 ($O_2$) in the offgas downstream from combustion chamber, ascertained experimentally in this series of experiments. The fuel feed is 200 kg/h (household waste Hu=9 to 10 MJ/kg) and the offgas flow rate is approximately 1000 Nm³/h. The stoichiometry of the primary air is approximately 0.9 and the grate speed is approximately 10 cm/min. In the basic state A, the combustion system operates without the injection of a water-gas mixture into the combustion chamber, in other words, in a manner corresponding to an installation according to FIG. 1. States B and C are established if the two-fluid nozzle only injects air, namely, 12 Nm$^3$/h at 4 bar (B) and 15 Nm$^3$/h at 5 bar (C), which corresponds to about 1.5% of the total offgas stream. This measure already results in a reduction in nitrogen oxide formation in the order of magnitude of approximately 17% (from about 300 to 250 mg/Nm$^3$ of NO), whereby this value is only negligibly affected by the amount of pressure and air (within the above-mentioned parameter range). This fact as well as the constant oxygen volume throughout the entire series of experiments lead to the conclusion that the reduction in nitrogen oxide formation is primarily brought about by the axial turbulence and thus by the homogenization of the combustion gases over the above-mentioned combustion bed areas.

Figure 5:
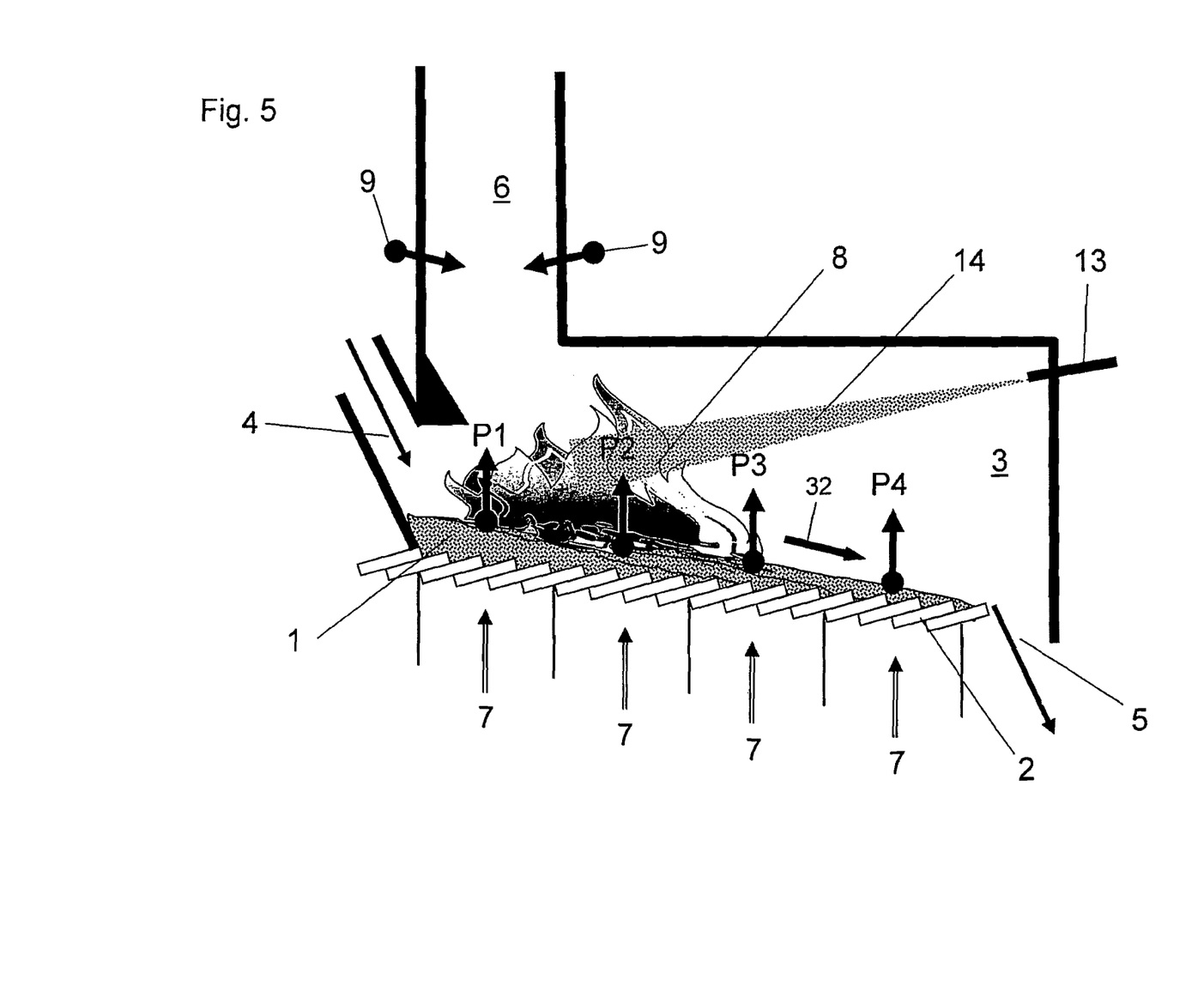
FIG. 5—a cross section of a grate-fired furnace with four combustion-bed zones and a two-fluid nozzle.

The considerable reduction in the nitrogen oxide formation rate, namely by up to 66% (from about 300 to about 100 mg/Nm$^3$ of NO) in comparison to the initial state A, however, is achieved by additionally injecting water (see FIG. 5). On the basis of the air injection parameters according to state B (12 Nm$^3$/h at 4 bar), a two-fluid nozzle is employed to inject an additional 20 l/h (state D), 30 l/h (state E), 40 l/h (state F) as well as 50 l/h (state G) of water. At the same time, the temperature of the offgas downstream from the offgas burn-out zone also drops from over 1000° C. [1832° F.] to below 900° C. [1652° F.]. In this process, a steadily decreasing rate of nitrogen oxide formation was established with a still-unchanged oxygen concentration and increasing water flow, whereby the increments of the reduction become continuously less with the absolute water volume. This means that only slight increases in the reduction of NO are attained at the expense of relatively high energy losses. It was possible to substantiate the reproducibility of this reduction measure by repeatedly interrupting the free jet, intermittently establishing state A, (see FIG. 6). Therefore, the further reduction in the rate of nitrogen oxide formation from state B to state D to G can be ascribed exclusively to the additional reduction in the heating value of the offgases and to the simultaneous mixing (here: not of the solid fuel) brought about by the water feed.

The water feed is, for example, regulated via the nitrogen oxide concentration. In order to avoid excessive energy losses in the offgas (limitation of a downstream heat utilization), the water feed in the offgas lies below 50 g/m$^3$, for example below 30 g/m$^3$.

Figure 7A:
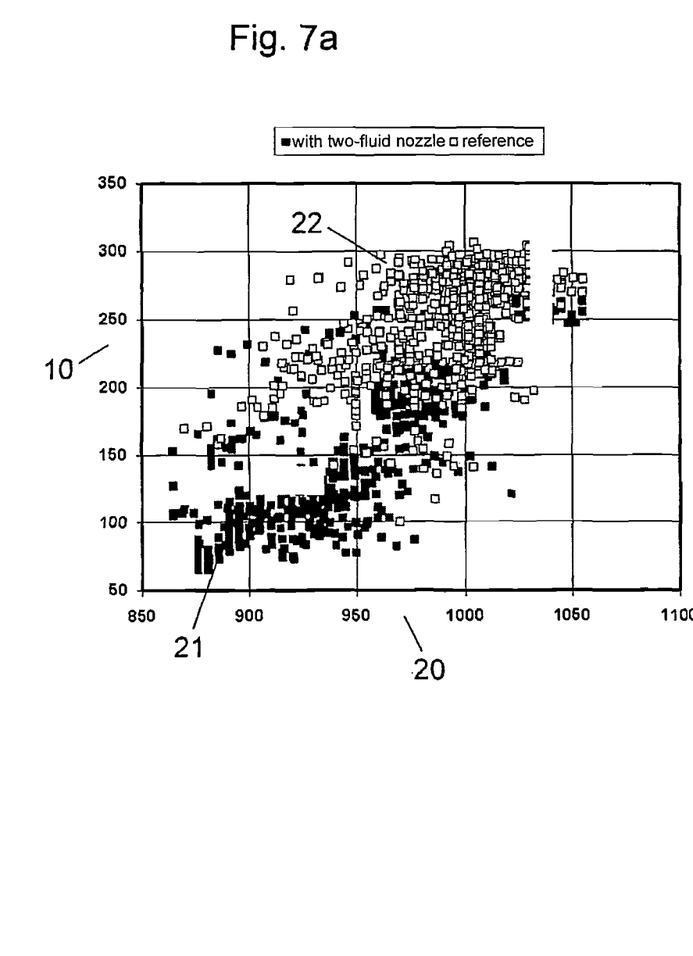
FIGS. 7a and 7b—the nitrogen and laughing gas concentrations in the offgas as a function of the offgas temperature downstream from the offgas burn-out zone; as well as FIGS. 8a to 8c—the curves of the water concentration, of the formation of nitrogen oxide, of the formation of laughing gas as well as of the temperature distributions above the combustion bed ascertained as a function of the time within the scope of experiment example 4.
Figure 7B:
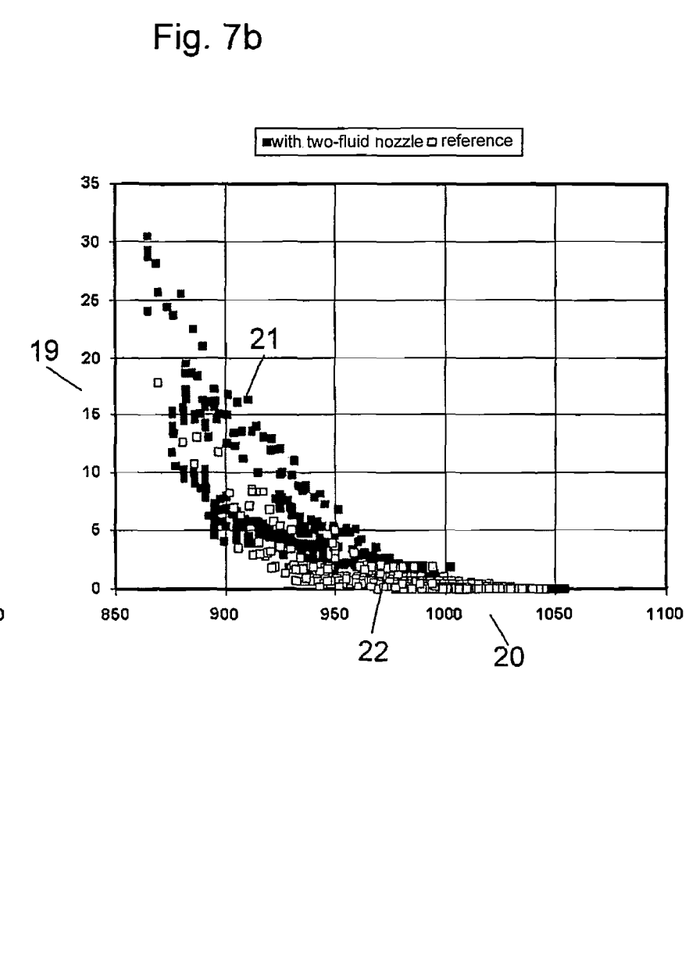

At a high water feed using a two-fluid nozzle (see the measured values with water feed 21), the temperature drops and a drastic reduction in the NO$_x$ formation occurs in comparison to the measured values without the addition of water (reference measured values 22) (see nitrogen oxide concentrations 10 over the offgas temperature 20 in FIG. 7a). In this process, the water content in the offgas downstream from the offgas burn-out zone (that is to say, also downstream from the boiler) increases by up to 50 g/Nm$^3$, in contrast to which the temperature downstream from the offgas burn-out zone drops. No N$_2$O formation (laughing gas concentration 19) was observed above 950° C. [1742° F.] downstream from the offgas burn-out zone, as is also depicted in FIG. 7b. The formation of N$_2$O below 950° C. [1742° F.] is only dependent on the offgas temperature 20 and not on the water content itself. The tendency towards nitrogen oxide formation is downwards as the temperature decreases. In comparison to a reference setting with a two-fluid nozzle, the mixing and water addition, preferably with a two-fluid nozzle at the same offgas temperature downstream from the offgas burn-out zone, translate into a lower nitrogen oxide concentration (see FIG. 7a). The cause of this can be the reduction in the gas heating value above the combustion bed upstream from the offgas burn-out zone.

According to the 17$^{th}$ BImSchV (German Federal Immission Control Act), an emission limit value of 200 mg/Nm$^3$ (calculated as NO$_2$ for a reference oxygen content of 11% O$_2$) is permissible, and the proposed method can stay well below this limit. No deterioration of the offgas burn-out was observed, which was substantiated by means of a CO measurement. Constant values within the range of approximately 1 mg/Nm$^3$ were measured at all times. No N$_2$O was detected above an offgas temperature of 970° C. [1778° F.] before the addition of secondary air and of 950° C. [1742° F.] after the addition of secondary air.

The described measure should be combined with additional measures to reduce nitrogen oxide, for example, changing the distribution of primary air or secondary air (see [2] and [3]). It is advantageous to combine high volumes of primary air (primary air stoichiometries within the range from 0.6 to 1, for example in the range from 0.7 to 0.9) with high transport speeds of the combustion bed (that is to say, higher than the above-mentioned 10 cm/min). A combination of these two parameters can achieve a reduction in the NO concentration from about 280 to about 150 mg/Nm$^3$ (i.e. an NO reduction of more than 45%) without reducing the energetic utilization of the heat content of the offgas (for household waste having a lower heating value Hu=7 to 8 MJ/kg).

Additional experiments have demonstrated that high fixed-bed transport speeds (that is to say, higher than the above-mentioned 10 cm/min) may only be necessary in the area of the front half of the grate. The rear areas of the grate can be operated correspondingly slower, so that altogether, sufficient time is available for the burn-out of the residual carbon in the grate ash.

Experiment Example 4

Within the scope of this experiment example, household waste (Hu=7 MJ/kg) is incinerated in the TAMARA pilot plant at a primary air ratio of approximately 0.65 and with an oxygen fraction in the offgas (downstream from the boiler) approximately at a constant 10 vol-% dry. In contrast to the above-mentioned experiment examples, the grate speed in the individual grate areas is not the same here; it is kept at a constant 22 cm/min in the combustion bed areas P$_1$ and P$_2$ (front half of the grate) and further reduced in the rear half of the grate for every combustion bed area (P$_3$=11 cm/min, P$_4$=5 cm/min). The distribution of the relative dwell times of the solid fuel in the above-mentioned combustion bed areas P$_1$ to P$_4$ was consequently 12%, 12%, 24%, 52%. On the basis of the above-mentioned general relationships, these operating parameters already yielded a low nitrogen oxide formation value of about 150 mg/Nm$^3$, measured downstream from the offgas burn-out zone, and also a good burn-out of the slag.

Figure 8A:
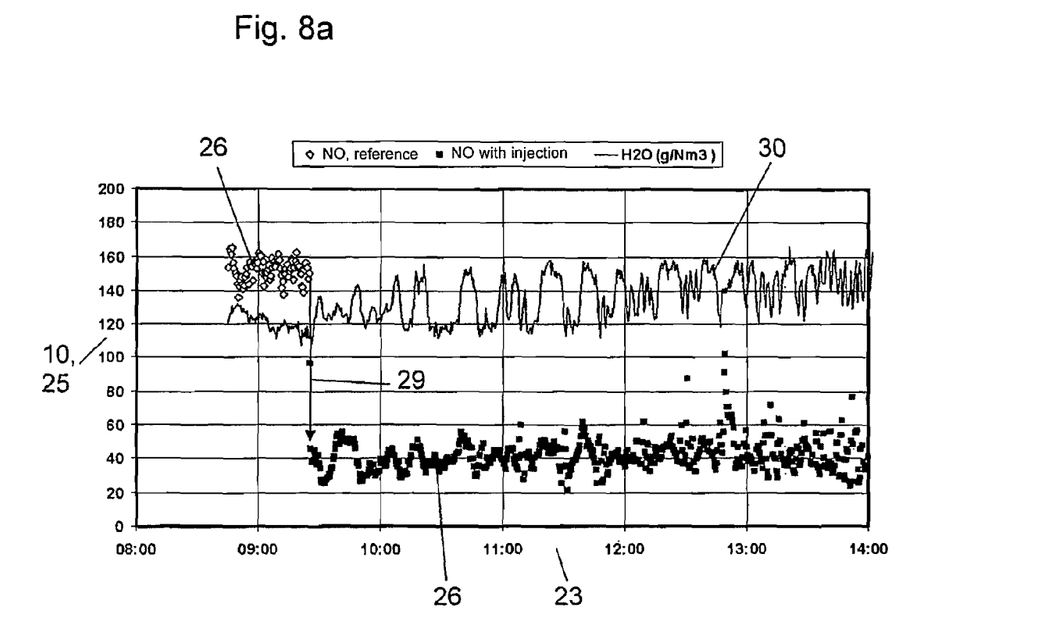
Figure 8B:
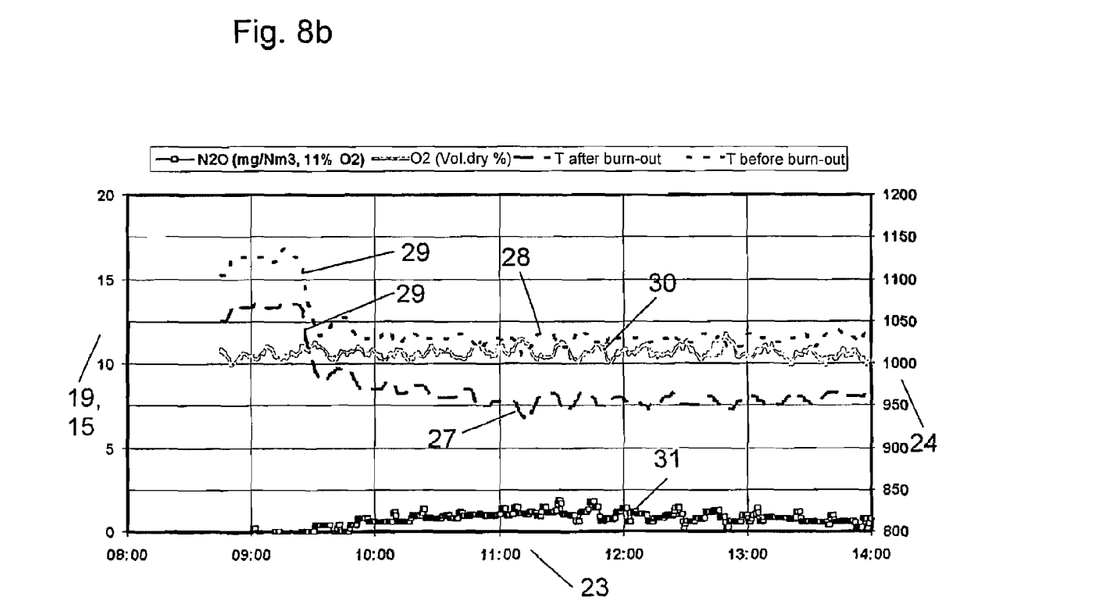

In FIGS. 8a and 8b, the measured nitrogen oxide concentrations 10 in mg/Nm$^3$ and the water concentration 25 in g/Nm$^3$ (FIG. 8a) as well as the laughing gas concentrations 19 in mg/Nm$^3$ and the temperatures 24 in ° C. (FIG. 8b) are plotted over the time of day. At about 9:20 a.m., a water/gas jet was introduced by means of the two-fluid nozzle, which can be seen from the abrupt drop 29 in the curve of the nitrogen oxide concentration 26 as well as in the temperature curve 27 (after the offgas has left the burn-out zone) and in the temperature curve 28, upstream from the offgas burn-out zone. The level of the offgas moisture curve 30, in contrast, only rises slightly due to the small amount of water injected. During the regulation step, the temperatures drop upstream from the offgas burn-out zone to values of approximately 1030° C. [1886° F.] and to values of approximately 950° C. [1742° F.] downstream from the offgas burn-out zone.

Figure 8C:
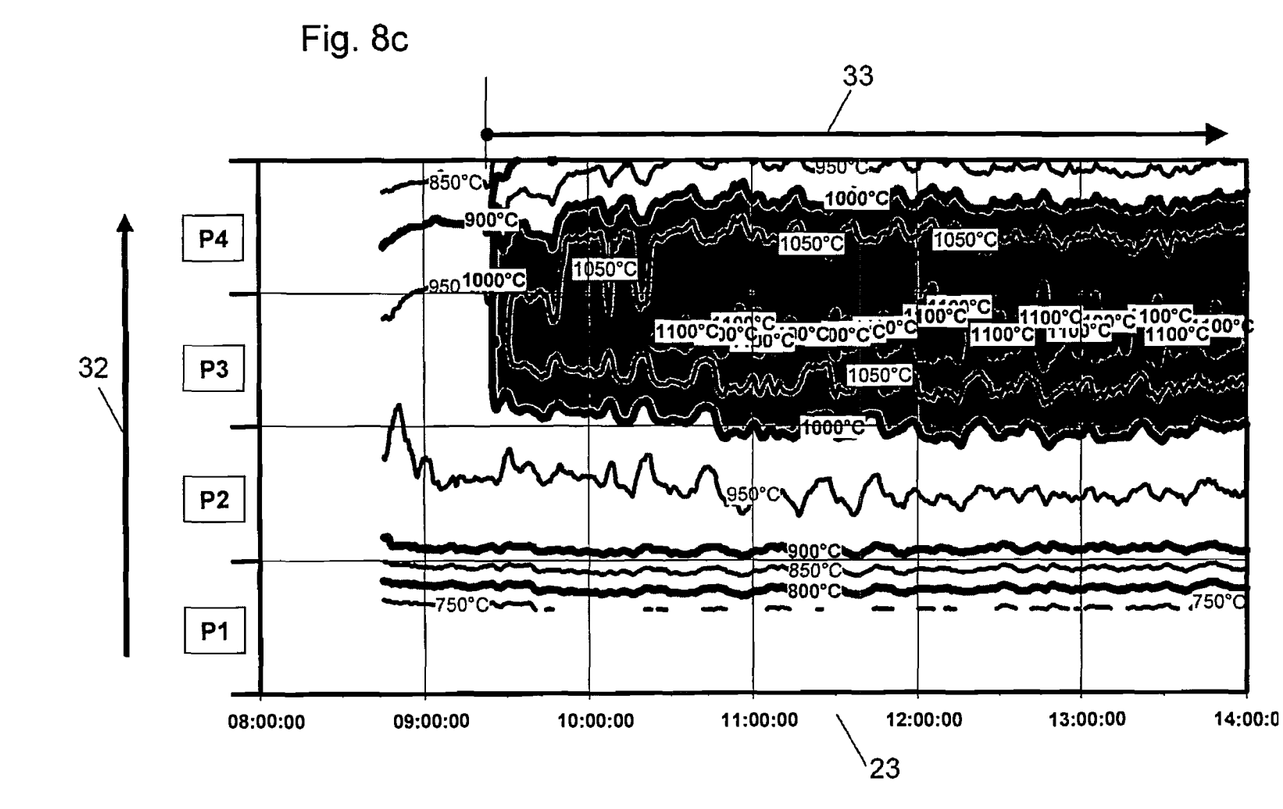

Moreover, FIG. 8c shows the axial temperature distributions above the combustion bed in the individual combustion bed areas $P_1$ to $P_4$, plotted over the time of day 23 of the experiment. The isotherms are each indicated with their temperatures. The temperatures above the rear half of the grate of the combustion bed rise markedly at the beginning of and during the injection 33. This effect has positive consequences for the quality of the slag.

The water volume introduced by means of the installed two-fluid nozzle is regulated by measuring the nitrogen oxide in the offgas downstream from the boiler (that is to say, downstream from the offgas burn-out zone). The control loop is programmed in such a way that the maximum water amount is limited by a minimum temperature of 950° C. [1742° F.](see the temperature curve 27 in FIG. 8b) in the combustion space. The target value of the regulation is set at 40 mg/Nm³ (see the nitrogen oxide concentration curve 16 in FIG. 8a). Immediately after the regulation system has been put into operation, the nitrogen oxide value drops spontaneously (see the graduated decreases 29). This state is maintained over a period of time of more than 4 hours. The mean increase in the offgas moisture (curve 30) is very low, averaging about 25 g/Nm³. The fluctuations of the offgas moisture during the regulation phase are caused by the set regulation parameters (PID controller) and by the brief fluctuation of the heating value of the fuel, and are not significant for the efficiency of the energetic utilization and for the efficiency in reducing the $NO_x$. The extremely low nitrogen oxide values attained are comparable to those of expensive SCR methods and are far below the statutory limit values.

When the temperature curve 27 approaches the 950° C. [1742° F.] limit, trace concentrations of up to 2 to 3 mg/Nm³ occur (see FIG. 8b: laughing gas concentration curve 31). However, the maximum laughing gas concentrations measured in the described experiment are close to the detection limit and are negligible.

The mixing of the combustion gases in the combustion space before the addition of secondary air markedly raises the gas temperature, despite the addition of water, above the combustion bed in the area of the rear half of the grate and, due to the resulting higher gas injection, also in the combustion bed in the rear area of the combustion bed. As a result, the slag is thoroughly sintered there and thus rendered inert, so that this favors the use of these residual materials as aggregates, without the need for any complex and thus expensive after-treatment. This is why this positive side effect of waste incineration is advantageous.

The concentrations, especially of carbon (TOC), chloride and even sulfate in the slag are markedly reduced due to the temperature increase in the combustion chamber and in the slag bed of the rear combustion bed zones, which also translates into an advantageous reduction in the ratio of PCDD/F formation in the slag.

LIST OF REFERENCE NUMERALS 1 combustion bed
2 firing grate
3 combustion chamber
4 inlet
5 outlet
6 offgas burn-out zone
7 primary gas feed
8 combustion, flame
9 secondary gas injection
10 nitrogen oxide concentration
11 mean heating value
12 maximum heating value
13 two-fluid nozzle
14 jet, free jet
15 oxygen concentration
16 experiment time
17 primary air ratio
18 moving grate speed
19 laughing gas concentration
20 offgas temperature downstream from the offgas burn-out zone
21 measured values with the addition of water
22 reference measured values
23 time of day
24 temperature
25 water concentration, dry
26 nitrogen oxide concentration curve
27 temperature curve after the offgas has left the burn-out zone
28 temperature curve in the offgas burn-out zone
29 graduated decrease
30 offgas moisture curve
31 laughing gas concentration curve
32 fuel transport direction
33 injection

The invention claimed is:

1. An apparatus for reducing the formation of nitrogen oxide on a primary side of a furnace and reduce or avoid nitrous oxide and ammonia slip in an offgas of the furnace, the furnace being configured to burn a fuel in a combustion process having at least two stages, the apparatus comprising:
 a combustion chamber including a grate disposed therein;
 a combustion bed configured to receive a primary gas including oxygen so as to burn the fuel on the grate, the combustion bed including a plurality of bed areas, each of the bed areas having a respective feed of the primary gas and a partial offgas stream;
 an offgas burn-out zone downstream from the combustion chamber configured for after-burning of incompletely burned offgas components;
 a secondary gas introduction device configured to introduce a secondary gas including oxygen into the offgas burn-out zone; and
 an injection device configured to inject a water-gas mixture as at least one free jet above a surface of the combustion bed upstream from the offgas burn-out zone so that the at least one free jet axially penetrates, over all the bed areas of the combustion bed, the partial offgas streams of all the bed areas and increases a temperature of the offgas above the combustion bed at a rear portion of the bed areas upstream from the downstream offgas burn-out zone.

2. The apparatus as recited in claim 1, wherein the furnace includes a grate-fired furnace, and wherein the bed areas are disposed one after the other and each have a respective own primary gas feed.

3. The apparatus as recited in claim 1, wherein the water-gas mixture includes at least one of water-air, water-offgas and water-steam.

4. The apparatus as recited in claim 1, wherein the at least one free jet is at least one two-fluid nozzle configured at a jet angle equal to or less than 15°.

5. The apparatus as recited in claim 1, wherein the injection device is configured to inject the water-gas mixture to establish a minimum temperature for the offgas downstream from the offgas burn-out zone of 950° C.

6. The apparatus as recited in claim 1, wherein the combustion chamber includes an inlet and an outlet where a transport speed is set so that a transport speed of a front half of the combustion bed disposed adjacent to the inlet is at least 30% faster than a transport speed of a back half of the combustion bed disposed adjacent to the outlet, so as to reduce the heating value of the offgas disposed upstream from the offgas burn-out zone to attain a burn-out of the fuel to a residual carbon concentration of less than 1%.

7. The apparatus as recited in claim 1 wherein the injection device is configured to inject the water-gas mixture so as to reduce a heating value of the offgas between the surface of the combustion bed and the offgas burn-out zone.

8. The apparatus as recited in claim 1 wherein the injection device is configured to inject the water-gas mixture such that the at least one free jet increases the temperature of the offgas above the combustion bed at a rear portion of the bed areas upstream from the downstream offgas burn-out zone to over 1000° C.

9. A method for reducing a formation of nitrogen oxide on a primary side of a furnace, reducing carbon, chloride, sulfate and polychlorinated dibenzodioxins and dibenzofurans (PCDD/F) in a slag, and reducing or avoiding nitrous oxide and ammonia slip in an offgas of the furnace in which a fuel is burned in a combustion process having at least two stages, the method comprising:
passing a fuel consecutively through each of a plurality of bed areas of a combustion bed of the furnace;
feeding, individually to each of the bed areas, a primary gas including oxygen so as to burn the fuel in the combustion chamber of the furnace;
introducing, into a downstream offgas burn-out zone, a secondary gas including oxygen so as to after-burn incompletely burned offgas components formed during the burning of the fuel; and
axially mixing partial offgas streams from the bed areas by injecting a water-gas mixture as at least one free jet above a surface of the combustion bed upstream from the downstream offgas burn-out zone so that the at least one free jet penetrates, over all the bed areas of the combustion bed, the partial offgas streams of all the bed areas so as to reduce a heating value of the offgas between the surface of the combustion bed and the downstream offgas burn-out zone and so as to increase a temperature of the offgas above the combustion bed at a rear portion of the bed areas upstream from the downstream offgas burn-out zone.

10. The method as recited in claim 9 wherein the furnace includes a grate-fired furnace, and wherein the bed areas are disposed one after the other and each have a respective own primary gas feed.

11. The method as recited in claim 9, wherein the water-gas mixture includes at least one of water-air, water-offgas and water-steam.

12. The method as recited in claim 9, further comprising generating the at least one free jet using at least one two-fluid nozzle at a jet angle equal to or less than 15°.

13. The method as recited in claim 9, wherein a volume of the water-gas mixture injected is equal to or lower than 10% of a total volume of primary gas and secondary gas.

14. The method as recited in claim 9, further comprising determining a volume of water in the water-gas mixture injected so as to provide a maximum $N_2O$ concentration in the offgas downstream from the offgas burn-out zone of 5 mg/Nm$^3$.

15. The method as recited in claim 9, further comprising determining a volume of water in the water-gas mixture injected so as to provide a minimum temperature for the offgas downstream from the offgas burn-out zone of 950° C.

16. The method as recited in claim 9, wherein a volume of the water-gas mixture injected is established using a maximum nitrous oxide concentration in the offgas downstream from the offgas burn-out zone.

17. The method as recited in claim 9, further comprising setting the feeding of the primary gas so as to establish a stoichiometry of less than 1 in the combustion chamber so as to reduce the heating value of the offgas downstream from the offgas burn-out zone.

18. The method as recited in claim 17, wherein the setting is performed so as to establish a stoichiometry between 0.7 and 0.9.

19. The method as recited in claim 9, wherein the combustion chamber includes an inlet and an outlet, and further comprising setting a transport speed in the combustion bed so that a transport speed of a front half of the combustion bed disposed adjacent to the inlet is at least 30% faster than a transport speed of a back half of the combustion bed disposed adjacent to the outlet, so as to reduce the heating value of the offgas upstream from the offgas burn-out zone to attain a burn-out of the fuel to a residual carbon concentration of less than 1%.

20. The method as recited in claim 9, wherein the transport speed of the front half of the combustion bed is at least 50% faster than the transport speed of the back half of the combustion bed.

21. The method as recited in claim 9, further comprising determining a volume of water in the water-gas mixture injected using a target nitrogen oxide concentration in the offgas downstream from the offgas burn-out zone, the determined volume of water being limited by at least one of a minimum temperature of 950° C. for the offgas downstream from the offgas burn-out zone and a maximum $N_2O$ concentration in the offgas downstream from the offgas burn-out zone of 5 mg/Nm$^3$.

22. The method as recited in claim 9, wherein the temperature of the offgas above the combustion bed at a rear portion of the bed areas upstream from the downstream offgas burn-out zone is increased to over 1000° C. by the at least one free jet.

* * * * *